United States Patent
Ho

(10) Patent No.: US 11,979,179 B2
(45) Date of Patent: May 7, 2024

(54) TRANSMISSION CIRCUIT

(71) Applicant: ASMedia Technology Inc., New Taipei (TW)

(72) Inventor: Chieh-Jui Ho, New Taipei (TW)

(73) Assignee: ASMedia Technology Inc., New Taipei (TW)

( * ) Notice: Subject to any disclaimer, the term of this patent is extended or adjusted under 35 U.S.C. 154(b) by 48 days.

(21) Appl. No.: 17/890,271

(22) Filed: Aug. 18, 2022

(65) Prior Publication Data
US 2024/0014836 A1 Jan. 11, 2024

(30) Foreign Application Priority Data

Jul. 11, 2022 (TW) .................................. 111125903

(51) Int. Cl.
H04B 1/04 (2006.01)
H02H 9/04 (2006.01)

(52) U.S. Cl.
CPC ........... *H04B 1/0475* (2013.01); *H02H 9/045* (2013.01)

(58) Field of Classification Search
CPC ............................. H04B 1/0475; H02H 9/045
See application file for complete search history.

(56) References Cited

U.S. PATENT DOCUMENTS

| 7,470,968 | B2 * | 12/2008 | Babcock .......... G01R 31/31926 324/754.28 |
| 8,451,058 | B2 * | 5/2013 | Cui .......................... H03F 1/42 330/250 |
| 10,862,521 | B1 | 12/2020 | Raviprakash et al. |
| 11,088,719 | B1 | 8/2021 | Liu et al. |
| 2008/0123771 | A1 * | 5/2008 | Cranford ............. H04L 25/0278 333/17.3 |
| 2019/0123551 | A1 | 4/2019 | Yuan et al. |

FOREIGN PATENT DOCUMENTS

| CN | 113517899 | 10/2021 |
| TW | I454953 | 10/2014 |

* cited by examiner

*Primary Examiner* — Sam K Ahn
*Assistant Examiner* — Amneet Singh
(74) *Attorney, Agent, or Firm* — JCIPRNET

(57) ABSTRACT

A transmission circuit is provided. The transmission circuit includes a T-coil, a first resistance value generator, a second resistance value generator and a capacitance value generator. The first resistance value generator generates a first resistance value according to a first control signal. The second resistance value generator generates a second resistance value according to a second control signal. The capacitance value generator generates a capacitance value according to a third control signal. A gain spectrum of the transmission circuit is adjusted according to the first resistance value, the second resistance value and the capacitance value.

10 Claims, 4 Drawing Sheets

TRANSMISSION CIRCUIT

CROSS-REFERENCE TO RELATED APPLICATION

This application claims the priority benefit of Taiwan application serial no. 111125903, filed on Jul. 11, 2022. The entirety of the above-mentioned patent application is hereby incorporated by reference herein and made a part of this specification.

BACKGROUND

Technical Field

The present disclosure relates to a transmission circuit, and more particularly, to a transmission circuit capable of adjusting the transmission bandwidth.

Description of Related Art

Generally speaking, an electronic device may receive or send a transmission signal through a transmission circuit. However, in order to maintain good signal transmission quality, the transmission bandwidth and signal-to-noise ratio (SNR) of the transmission circuit must be adjusted accordingly based on the change of the transmission signal frequency. Therefore, how to provide a transmission circuit capable of adjusting the transmission bandwidth is one of the research focuses for practitioners in the art.

SUMMARY

The present disclosure provides a transmission circuit capable of adjusting the transmission bandwidth.

A transmission circuit of the disclosure includes a T-coil, a first resistance value generator, a second resistance value generator and a capacitance value generator. The first end of the T-coil is coupled to the first input and output (I/O) node. The second end of the T-coil is coupled to the second I/O node. The first resistance value generator is coupled to the third end of the T-coil. The first resistance value generator generates a first resistance value according to a first control signal. The second resistance value generator is coupled to the second end of the T-coil. The second resistance value generator generates a second resistance value according to a second control signal. The capacitance value generator is coupled to the second end of the T-coil. The capacitance value generator generates a capacitance value according to a third control signal. A gain spectrum of the transmission circuit is adjusted according to the first resistance value, the second resistance value and the capacitance value.

Based on the above, the gain spectrum of the transmission circuit is adjusted according to the first resistance value, the second resistance value and the capacitance value. The transmission circuit may adjust the gain spectrum accordingly. In this way, the transmission circuit may maintain good signal transmission quality.

In order to make the above-mentioned features and advantages of the present disclosure more comprehensible, the following examples are given and described in detail with the accompanying drawings as follows.

DESCRIPTION OF THE EMBODIMENTS

Part of the embodiments of the present disclosure will be described in detail with reference to the accompanying drawings. The reference symbols quoted in the following description will be regarded as denoting the same or similar components when the same component symbols are shown in different drawings. These exemplary embodiments are only a part of the disclosure and do not disclose all possible embodiments of the disclosure. Rather, these exemplary embodiments are only examples within the scope of claims of the present disclosure.

Figure 1:
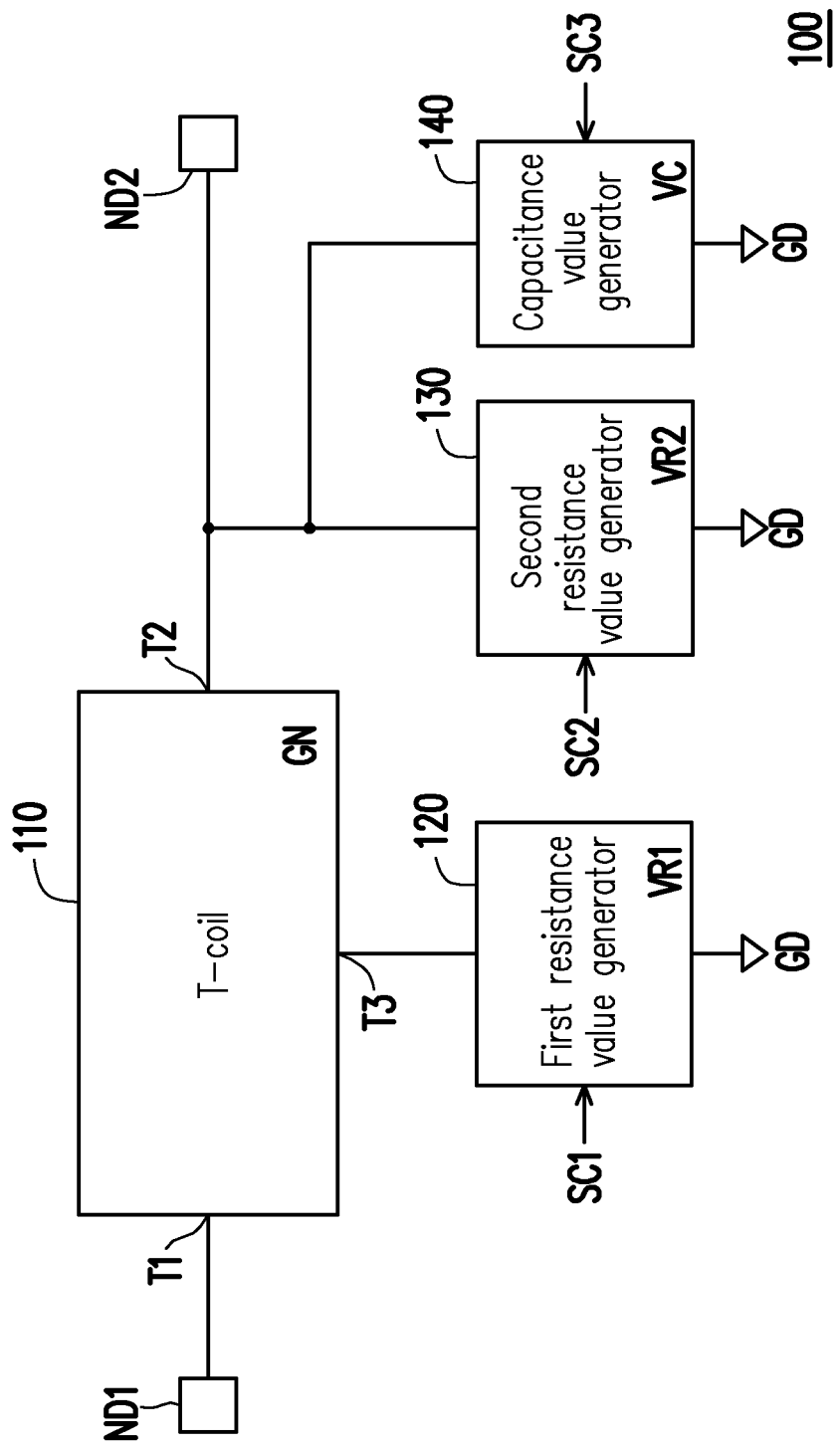
FIG. 1 is a schematic view of a transmission circuit according to a first embodiment of the present disclosure.

Please refer to FIG. 1, which is a schematic view of a transmission circuit according to a first embodiment of the present disclosure. In this embodiment, the transmission circuit 100 is configured as a transmission interface of an electronic device (not shown). The transmission circuit 100 includes a T-coil 110, a first resistance value generator 120, a second resistance value generator 130 and a capacitance value generator 140. The first end T1 of the T-coil 110 is coupled to a first input-output (I/O) node ND1. The second end T2 of the T-coil 110 is coupled to the second I/O node ND2. In this embodiment, the first I/O node ND1 and the second I/O node ND2 are, for example, signal I/O pins or signal I/O pads, respectively. For example, the first I/O node ND1 is connected to the signal transmission channel. The second I/O node ND2 is connected to the receiver circuit and/or the transmitter circuit of the electronic device (though the present disclosure is not limited thereto).

In this embodiment, the first resistance value generator 120 is coupled to the third end T3 of the T-coil 110. The first resistance value generator 120 generates a first resistance value VR1 according to the first control signal SC1. The second resistance value generator 130 is coupled to the second end T2 of the T-coil 110. The second resistance value generator 130 generates a second resistance value VR2 according to the second control signal SC2. The capacitance value generator 140 is coupled to the second end T2 of the T-coil 110. The capacitance value generator 140 generates a capacitance value VC according to the third control signal SC3. In addition, the first resistance value generator 120 adjusts the first resistance value VR1 according to the change of the first control signal SC1. The second resistance value generator 130 adjusts the second resistance value VR2 according to the change of the first control signal SC2. The capacitance value generator 140 adjusts the capacitance value VC according to the change of the third control signal SC3.

Taking this embodiment as an example, the first resistance value generator 120 is coupled between the third end T3 of the T-coil 110 and the reference voltage GD (e.g., ground). The second resistance value generator 130 is coupled between the second end T2 of the T-coil 110 and the reference voltage GD. The capacitance value generator 140 is coupled between the second end T2 of the T-coil 110 and the reference voltage GD.

In this embodiment, the gain spectrum GN of the transmission circuit 100 is adjusted according to the first resistance value VR1, the second resistance value VR2 and the capacitance value VC. Further, the first resistance value VR1, the second resistance value VR2 and the capacitance value VC may be adjusted. Therefore, when the T-coil 110 is operating, the gain spectrum GN is adjusted based on the changes of the first resistance value VR1, the second resistance value VR2 and the capacitance value VC.

It should be mentioned that the transmission circuit 100 may adjust the gain spectrum GN correspondingly. In this way, the transmission circuit 100 may maintain good signal transmission quality.

In this embodiment, the peak value of the gain spectrum GN of the transmission circuit 100 is adjusted according to the ratio of the first resistance value VR1 and the second resistance value VR2. Therefore, the peak value of the gain spectrum GN may rise or fall according to the ratio of the first resistance value VR1 and the second resistance value VR2. Further, the ratio of the first resistance value VR1 and the second resistance value VR2 is substantially equal to the quotient of dividing the first resistance value VR1 by the second resistance value VR2 (i.e., VR1/VR2). The peak frequency of the gain spectrum GN of the transmission circuit 100 is adjusted according to the capacitance value VC.

Figure 2:
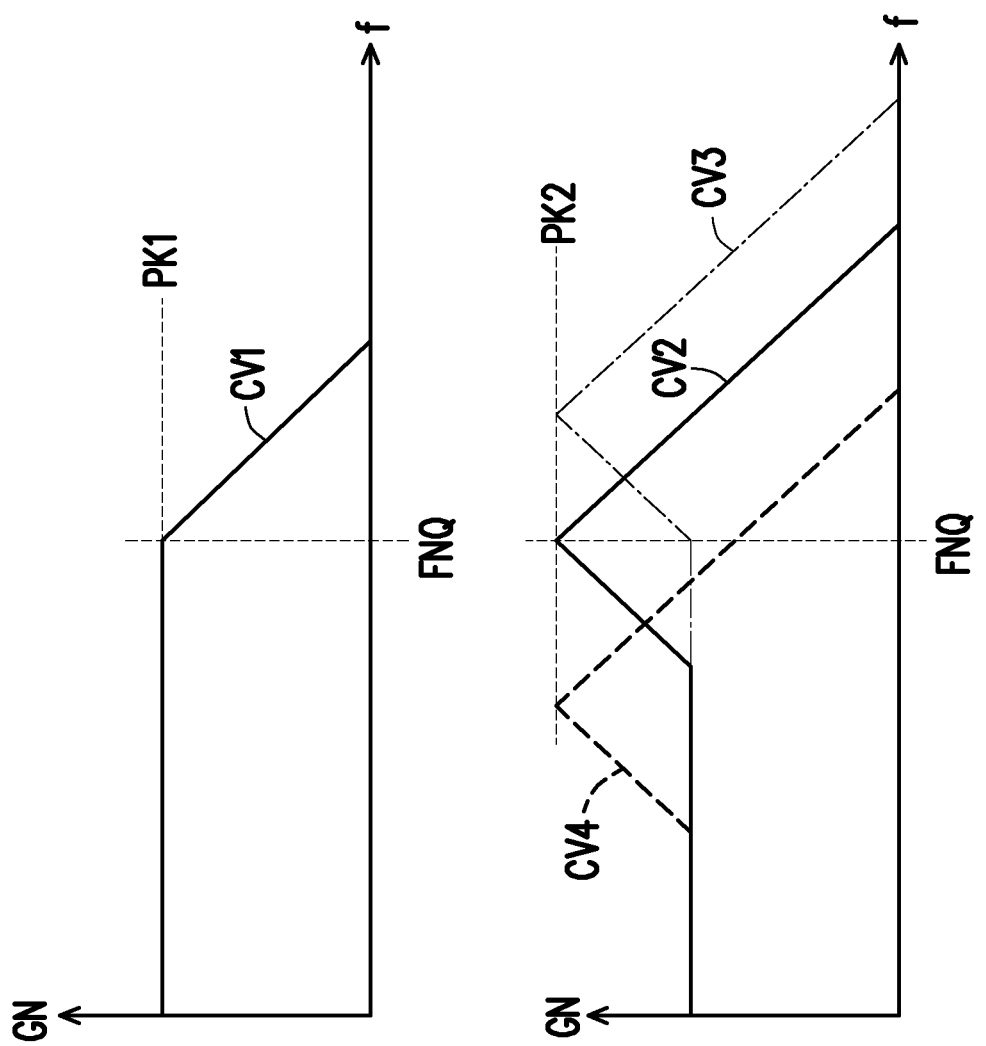
FIG. 2 is a schematic view of a gain spectrum according to an embodiment of the present disclosure.

Please refer to FIG. 1 and FIG. 2 at the same time. FIG. 2 is a schematic view of a gain spectrum according to an embodiment of the present disclosure. FIG. 2 shows curves CV1 to CV4 of the gain spectrum GN. When the first resistance value VR1 is significantly greater than the second resistance value VR2, the ratio of the first resistance value VR1 and the second resistance value VR2 will be very high. Therefore, the curve of the gain spectrum GN will be as shown by the curve CV1. The gain of curve CV1 does not change significantly in the frequency range less than or equal to the Nyquist frequency FNQ. The Nyquist frequency FNQ is related to the sampling frequency of the signal. The gain of curve CV1 decreases with frequency f in the frequency range greater than the Nyquist frequency FNQ. Therefore, the curve CV1 has the peak value PK1.

In the case where the capacitance value VC is not changed, when the first resistance value VR1 is decreased and/or the second resistance value VR2 is increased, the ratio of the first resistance value VR1 and the second resistance value VR2 is decreased. The gain spectrum GN is amplified in the frequency range close to the Nyquist frequency FNQ, as shown by the curve CV2. Therefore, the curve CV2 has the peak value PK2. The peak value PK2 of the curve CV2 is greater than the peak value PK1 of the curve CV1. Therefore, the curve CV2 has better transmission bandwidth and better signal-to-noise ratio (SNR). That is, the ratio of the first resistance value VR1 and the second resistance value VR2 has a negative correlation with the peak value of the gain spectrum GN.

Next, in the case where the first resistance value VR1 and the second resistance value VR2 are not changed, when the capacitance value VC is reduced, the peak frequency (or called the pole) of the gain spectrum GN will be shifted to higher frequency. Therefore, the gain spectrum GN is changed from the curve CV2 to the curve CV3. In the curve CV3, the bandwidth of the gain spectrum GN is increased. However, high frequency noise may be gained. On the other hand, when the capacitance value VC is increased, the peak frequency of the gain spectrum GN is shifted to a lower frequency. Therefore, the gain spectrum GN is changed from the curve CV2 to the curve CV4. That is, the capacitance value VC exhibits a negative correlation with the peak frequency of the gain spectrum GN. In the curve CV4, the bandwidth of the gain spectrum GN is reduced. Furthermore, based on the shift of gain spectrum GN, the peak frequency of the gain spectrum GN is significantly lower than the Nyquist frequency FNQ. Therefore, the curve CV4 may result in a lower signal recognition result.

Moreover, in the case where the first resistance value VR1 and the second resistance value VR2 are not changed, the peak value of the gain spectrum GN is not changed. Therefore, the peak values of the curves CV2 to CV4 are substantially maintained at the peak value PK2.

It should be noted that the Nyquist frequency FNQ is related to the sampling frequency of the signal. It may be seen that the first resistance value VR1, the second resistance value VR2 and the capacitance value VC may be adjusted based on the sampling frequency of the signal, so that the transmission circuit 100 may maintain good signal transmission quality.

Please return to the embodiment of FIG. 1, the first resistance value generator 120 and the second resistance value generator 130 may be implemented by variable resistors or other circuits capable of changing the internal resistance value, respectively. The capacitance value generator 140 may be implemented by a variable capacitor, a varactor, or other circuits capable of changing the internal capacitance value.

Figure 3:
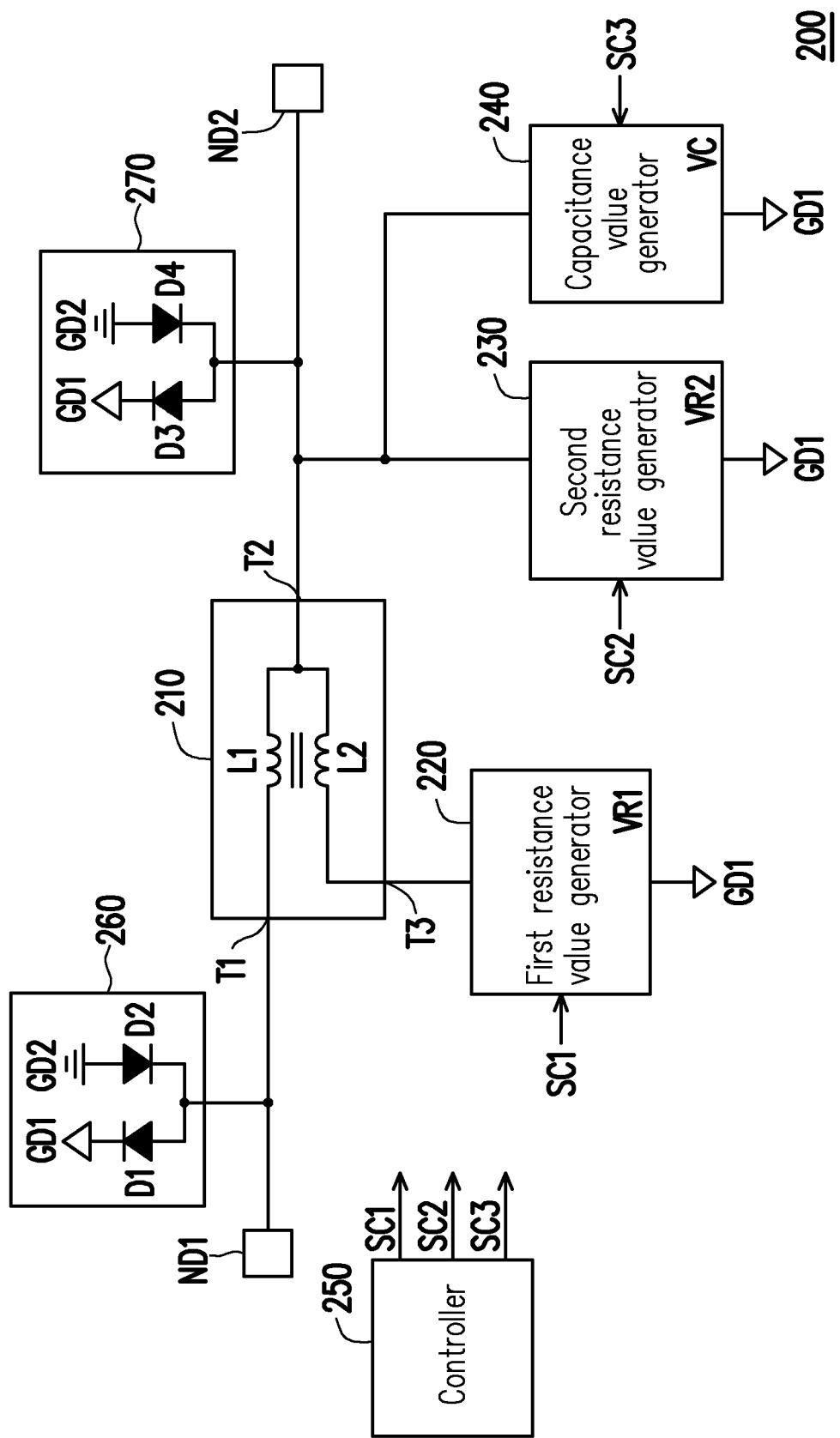
FIG. 3 is a schematic view of a transmission circuit according to a second embodiment of the present disclosure.

Please refer to FIG. 3, which is a schematic view of a transmission circuit according to a second embodiment of the present disclosure. In this embodiment, the transmission circuit 200 includes a T-coil 210, a first resistance value generator 220, a second resistance value generator 230 and a capacitance value generator 240. The first end T1 of the T-coil 210 is coupled to the first I/O node ND1. The second end T2 of the T-coil 210 is coupled to the second I/O node ND2. The T-coil 210 includes inductors L1 and L2. The first end of the inductor L1 serves as the first end T1 of the T-coil 210. The second end of the inductor L1 serves as the second end T2 of the T-coil 210. The first end of the inductor L2 is coupled to the second end of the inductor L1. The second end of the inductor L2 serves as the third end T3 of the T-coil 210.

In this embodiment, the T-coil 210 may be implemented by a coupled inductor (the present disclosure is not limited thereto).

In this embodiment, the first resistance value generator 220 is coupled between the second end of the inductor L2 of the T-coil 210 and the reference voltage GD1. The first resistance value generator 220 generates the first resistance value VR1 according to the first control signal SC1. The second resistance value generator 230 is coupled between the second end of the inductor L1 and the reference voltage GD1. The second resistance value generator 230 generates the second resistance value VR2 according to the second control signal SC2. The capacitance value generator 140 is coupled between the second end of the inductor L1 and the reference voltage GD1. The capacitance value generator 140 generates the capacitance value VC according to the third control signal SC3.

In this embodiment, the transmission circuit 200 further includes a controller 250. The controller 250 is coupled to the first resistance value generator 220, the second resistance value generator 230 and the capacitance value generator 240. The controller generates the first control signal SC1, the second control signal SC2 and the third control signal SC3. For example, the controller 250 may obtain the sampling frequency of the signal, and generate the first control signal SC1, the second control signal SC2 and the third control signal SC3 according to the sampling frequency. The controller 250 provides the first control signal SC1 to the first resistance value generator 220, provides the second control signal SC2 to the second resistance value generator 230, and provides the third control signal SC3 to the capacitance value generator 240.

In this embodiment, the controller 250 is, for example, a central processing unit (CPU), or other programmable general-purpose or special-purpose microprocessors, a signal conversion circuit, a digital signal processor (DSP), a programmable controller, an application specific integrated circuit (ASIC), a programmable logic device (PLD) or other similar devices or a combination of these devices, which may load and execute computer programs.

In some embodiments, the controller 250 may be implemented by a built-in controller of the electronic device. In other words, the first control signal SC1, the second control signal SC2 and the third control signal SC3 may be generated by the electronic device.

In this embodiment, the transmission circuit 200 further includes electrostatic discharge protection circuits 260 and 270. The electrostatic discharge protection circuit 260 is coupled to the first I/O node ND1. The electrostatic discharge protection circuit 260 protects the first I/O node ND1 from damage caused by electrostatic discharge (ESD). The electrostatic discharge protection circuit 270 is coupled to the second I/O node ND2. The electrostatic discharge protection circuit 270 protects the second I/O node ND2 from damage caused by ESD.

Taking this embodiment as an example, the electrostatic discharge protection circuit 260 includes diodes D1 and D2. The anode of the diode D1 is coupled to the first I/O node ND1. The cathode of the diode D1 is coupled to the reference voltage GD1. The cathode of the diode D2 is coupled to the first I/O node ND1. The anode of the diode D2 is coupled to the reference voltage GD2. The electrostatic discharge protection circuit 270 includes diodes D3 and D4. The anode of the diode D3 is coupled to the second I/O node ND2. The cathode of the diode D3 is coupled to the reference voltage GD1. The cathode of the diode D4 is coupled to the first I/O node ND1. The anode of the diode D4 is coupled to the reference voltage GD2.

In some embodiments, based on actual usage requirements, the transmission circuit 200 includes one of the electrostatic discharge protection circuits 260 and 270. The present disclosure is not limited to this embodiment.

Figure 4:
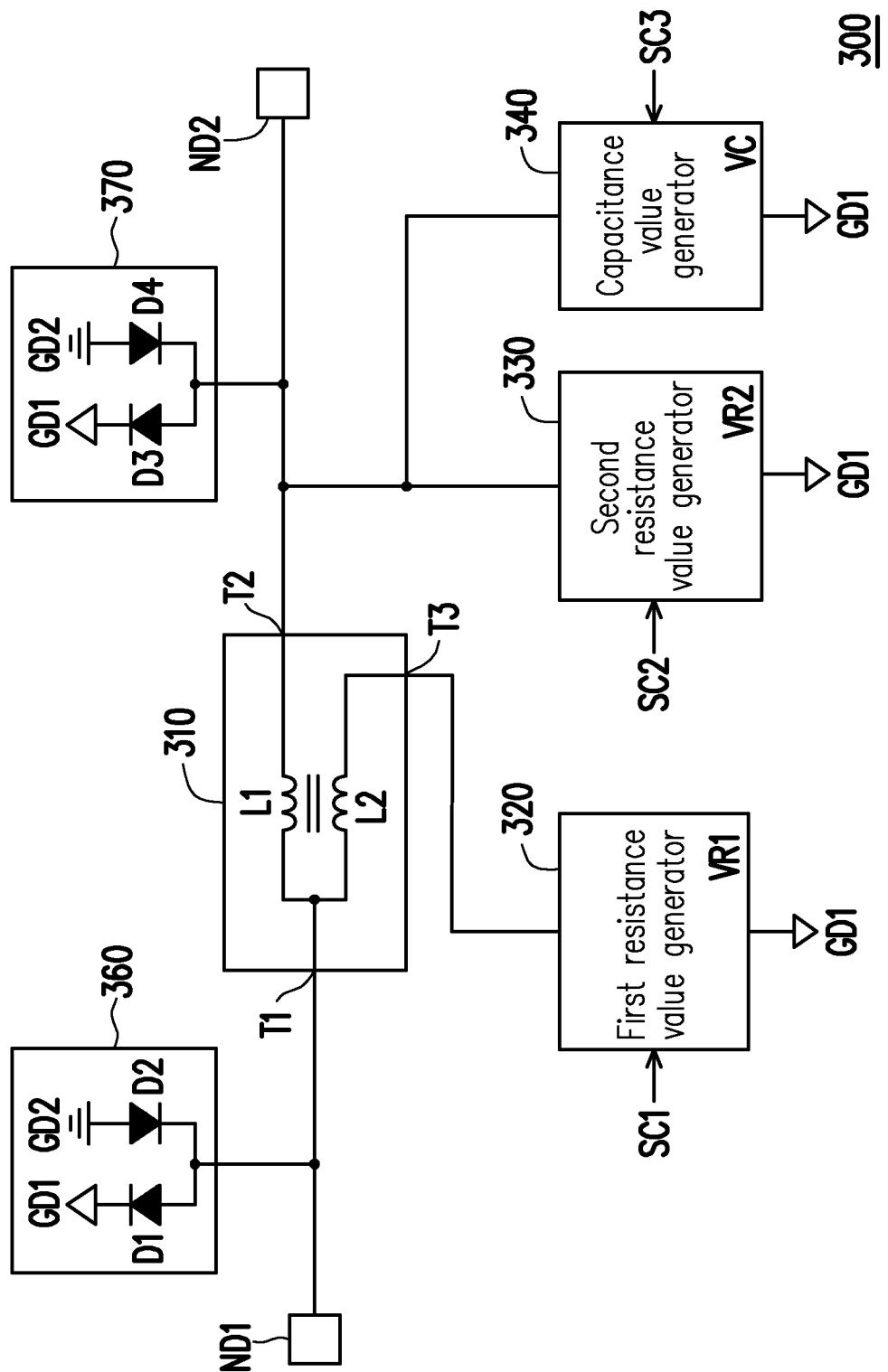
FIG. 4 is a schematic view of a transmission circuit according to a third embodiment of the present disclosure.

Please refer to FIG. 4, which is a schematic view of a transmission circuit according to a third embodiment of the present disclosure. In this embodiment, the transmission circuit 300 includes a T-coil 310, a first resistance value generator 320, a second resistance value generator 330, a capacitance value generator 340, and electrostatic discharge protection circuits 360 and 370. The first end T1 of the T-coil 310 is coupled to the first I/O node ND1. The second end T2 of the T-coil 310 is coupled to the second I/O node ND2. The T-coil 310 includes inductors L1 and L2. The first end of the inductor L1 serves as the first end T1 of the T-coil 310. The second end of the inductor L1 serves as the second end T2 of the T-coil 310. The first end of the inductor L2 is coupled to the first end of the inductor L1. The second end of the inductor L2 serves as the third end T3 of the T-coil 310.

In this embodiment, the implementation details of the first resistance value generator 320, the second resistance value generator 330, the capacitance value generator 340, and the electrostatic discharge protection circuits 360 and 370 may be derived from sufficient teaching of the first resistance value generator 220, the second resistance value generator 230, the capacitance value generator 240, and electrostatic discharge protection circuits 260 and 270 shown in FIG. 3. Therefore, the details will not be repeated here.

To sum up, the gain spectrum of the transmission circuit of the present disclosure is adjusted according to the first resistance value, the second resistance value and the capacitance value. The transmission circuit may adjust the gain spectrum accordingly. In this way, the transmission circuit may maintain good signal transmission quality. Further, the ratio of the first resistance value and the second resistance value exhibits a negative correlation with the peak value of the gain spectrum. The capacitance value exhibits a negative correlation with the peak frequency of the gain spectrum. The first resistance value, the second resistance value, and the capacitance value may be adjusted based on the Nyquist frequency. The transmission circuit may maintain a good signal-to-noise ratio and a suitable gain spectrum bandwidth.

Although the present disclosure has been disclosed above by embodiments, it is not intended to limit the present disclosure. Anyone with ordinary knowledge in the technical field can make some changes and modifications without departing from the spirit and scope of the present disclosure. Therefore, the scope to be protected by the present disclosure shall be determined by the scope of the appended claims.

What is claimed is:

1. A transmission circuit, comprising:
    a T-coil, wherein a first end of the T-coil is coupled to a first input and output (I/O) node, and a second end of the T-coil is coupled to a second I/O node;
    a first resistance value generator, coupled to a third end of the T-coil, and configured to generate a first resistance value according to a first control signal;
    a second resistance value generator, coupled to the second end of the T-coil, and configured to generate a second resistance value according to a second control signal; and
    a capacitance value generator, coupled to the second end of the T-coil, and configured to generate a capacitance value according to a third control signal,
    wherein a gain spectrum of the transmission circuit is adjusted according to the first resistance value, the second resistance value and the capacitance value.

2. The transmission circuit according to claim 1, further comprising:
    a controller, coupled to the first resistance value generator, the second resistance value generator and the capacitance value generator, and configured to generate the first control signal, the second control signal and the third control signal.

3. The transmission circuit according to claim 1, wherein a peak value of the gain spectrum is adjusted according to a ratio of the first resistance value and the second resistance value.

4. The transmission circuit according to claim 3, wherein:
    the ratio is substantially equal to a quotient of the first resistance value divided by the second resistance value, and
    the ratio exhibits a negative correlation with the peak value of the gain spectrum.

5. The transmission circuit according to claim 1, wherein a peak frequency of the gain spectrum is adjusted according to the capacitance value.

6. The transmission circuit according to claim 5, wherein the capacitance value exhibits a negative correlation with the peak frequency of the gain spectrum.

7. The transmission circuit according to claim 1, wherein the T-coil comprises:

a first inductor, wherein a first end of the first inductor serves as the first end of the T-coil, and a second end of the first inductor serves as the second end of the T-coil; and a second inductor, wherein a first end of the second inductor is coupled to the second end of the first inductor, and a second end of the second inductor serves as the third end of the T-coil.

8. The transmission circuit according to claim 1, wherein the T-coil comprises:

a first inductor, wherein a first end of the first inductor serves as the first end of the T-coil, and a second end of the first inductor serves as the second end of the T-coil; and a second inductor, wherein a first end of the second inductor is coupled to the first end of the first inductor, and a second end of the second inductor serves as the third end of the T-coil.

9. The transmission circuit according to claim 1, further comprising:

an electrostatic discharge protection circuit, coupled to the first I/O node, and configured to protect the first I/O node from a damage caused by electrostatic discharge (ESD).

10. The transmission circuit according to claim 1, further comprising:

an electrostatic discharge protection circuit, coupled to the second I/O node, and configured to protect the second I/O node from a damage caused by electrostatic discharge (ESD).

* * * * *